(12) United States Patent
Finley, Jr. et al.

(10) Patent No.: US 7,558,845 B2
(45) Date of Patent: Jul. 7, 2009

(54) MODIFYING A DHCP CONFIGURATION FOR ONE SYSTEM ACCORDING TO A REQUEST FROM ANOTHER SYSTEM

(75) Inventors: Paul Bernell Finley, Jr., Austin, TX (US); Joseph Vernon Lampitt, Austin, TX (US); Scott Vi Trieu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 10/782,675

(22) Filed: Feb. 19, 2004

(65) Prior Publication Data

US 2005/0188063 A1 Aug. 25, 2005

(51) Int. Cl.
*G06F 15/177* (2006.01)
(52) U.S. Cl. ........................ 709/220; 709/221
(58) Field of Classification Search ................ 709/222, 709/220, 221
See application file for complete search history.

(56) References Cited

U.S. PATENT DOCUMENTS

| | | | | |
|---|---|---|---|---|
| 7,139,818 | B1 * | 11/2006 | Kinnear et al. | 709/222 |
| 7,296,152 | B1 * | 11/2007 | MacPherson et al. | 713/168 |
| 2001/0054101 | A1 * | 12/2001 | Wilson | 709/225 |
| 2003/0163341 | A1 * | 8/2003 | Banerjee et al. | 705/1 |
| 2004/0162892 | A1 * | 8/2004 | Hsu | 709/221 |
| 2005/0105529 | A1 * | 5/2005 | Arberg et al. | 370/395.5 |
| 2005/0114492 | A1 * | 5/2005 | Arberg et al. | 709/223 |
| 2006/0036733 | A1 * | 2/2006 | Fujimoto et al. | 709/225 |

OTHER PUBLICATIONS

RFC 2131—Dynamic Host Configuration Protocol, Mar. 1997, available at http://www.faqs.org/rfcs/rfc2131.html as of Nov. 29, 2003.
DHCP Mini-HOWTO—available at http://tldp.org/HOWTO/DHCP/x74.html as of Nov. 29, 2003.

* cited by examiner

*Primary Examiner*—Larry D Donaghue
*Assistant Examiner*—Ryan J Jakovac
(74) *Attorney, Agent, or Firm*—Matthew W. Baca; Amy J. Pattillo

(57) ABSTRACT

A method, system, and program for modifying a DHCP configuration for one system according to a request from another system are provided. A first system specifies a modify packet to request modification of a stored configuration for a dynamically configured system. The first system then sends the modify packet to a DHCP server that manages the stored configuration for the dynamically configured system. Responsive to the DHCP server authenticating the first system as privileged to make the modification request, the DHCP server modifies the stored configuration according to the modify packet, such that one system can request modification of the DHCP configuration for another system without logging into the DHCP server.

3 Claims, 4 Drawing Sheets

MODIFYING A DHCP CONFIGURATION FOR ONE SYSTEM ACCORDING TO A REQUEST FROM ANOTHER SYSTEM

BACKGROUND OF THE INVENTION

1. Technical Field

The present invention relates in general to improved networking and in particular to improved control over a DHCP server by multiple client systems. Still more particularly, the present invention relates to enabling a first system to modify a DHCP configuration of a second system at a DHCP server without requiring a remote login to the DHCP server.

2. Description of the Related Art

Networking today is often based on a client-server model. In general, in a client-server model, the client system sends requests to the server and the server processes the requests and returns a result. Under a client-server model, a single system may act as a client in some cases and as a server in others.

Systems within a client-server network are typically assigned network addresses to identify themselves and establish connections with other systems in the network. In particular, a server configured as a Dynamic Host Configuration Protocol (DHCP) server allocates network addresses to dynamically configured systems. A network address assigned by a DHCP server typically has a configured lease time, after which the address is released.

In particular, Dynamic Host Configuration Protocol is an Internet protocol that provides configuration parameters to Internet hosts. In addition to functioning as a mechanism for DHCP server allocation of network addresses, DHCP is a protocol for supporting delivery of host-specific configuration parameters from a DHCP server to a host.

A DHCP server may be combined with another type of server within a network. Often, however, it is advantageous to have multiple servers that perform specific services, such as multiple installation servers, and a separate DHCP server.

When network systems interact with a separate DHCP server to set up configuration parameters, there are many scenarios in which one system needs to setup or modify the DHCP configuration parameters for another system. For example, consider an installation server that is a separate system from the DHCP server and is controlling the network installation of another system that is a DHCP client. For the installation to succeed, the client's lease time of a network address from the DHCP server must be increased so the lease does not expire during the installation. For the installation server to change the DHCP lease time configuration of another system, currently, the installation server must call a remote shell (rsh), secure shell (ssh), or other login function that allows the installation server to remotely login to the DHCP server to make the changes.

Use of an rsh or ssh, however, is undesirable for several reasons. First, a system administrator must set up a service on the DHCP server that allows remote clients, such as the installation server, to execute the rsh or ssh command and gain access to the DHCP server. Then, the remote client must remotely login to the DHCP server and execute commands to change the configuration in the DHCP server. Further, this solution is often undesirable because with rsh or ssh access, the remote client, such as the installation server, is able to modify more than just the configuration of the DHCP service. Finally, use of rsh or ssh is undesirable because the DHCP daemon must be restarted for the configuration changes to take effect.

Therefore, in view of the foregoing, it would be advantageous to provide a method, system, and program for enabling a first system to modify a second system's DHCP configuration at an independent DHCP server without requiring the first system to remotely login to the DHCP server, with limited configuration options, and without requiring the DHCP daemon to restart to effect the change.

SUMMARY OF THE INVENTION

Therefore, the present invention provides improved networking and in particular to improved control over a DHCP server by multiple client systems. Still more particularly, the present invention provides a method, system, and program for enabling a first system to request modification of a DHCP configuration for a second system at a DHCP server without requiring a remote login to the DHCP server, with limited configuration options, and without requiring a restart to apply the modified configuration.

According to aspect of the invention, a first system specifies a modify packet to request modification of a stored configuration for a dynamically configured system. The first system then sends the modify packet to a DHCP server which manages the stored configuration for the dynamically configured system, wherein the DHCP server is enabled to modify the stored configuration according to the modify packet. In particular, the first system may first be required to register with the DHCP server for modification privileges.

The modify packet specifies that that it is a DHCP modify packet, the client, class, or network to be modified, the option to be modified, and the value to assign to the option. In addition, the modify packet may specify other information typical in a DHCP packet.

According to another aspect of the invention, the DHCP server receives the modify packet and modifies the stored configuration for the dynamically configured system according to the modify packet. First, however, the DHCP server may authenticate the identity of the requesting system to determine which modification privileges the requesting system is allowed. Preferably, the first system must register and receive specified modification privileges that specify the types of options that can be modified, the values that can be assigned, and other parameters.

Multiple systems may act as the first system to specify a modify packet to request modification of a single dynamically configured system. Further, the first system may be a statically configured system or a dynamically configured system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
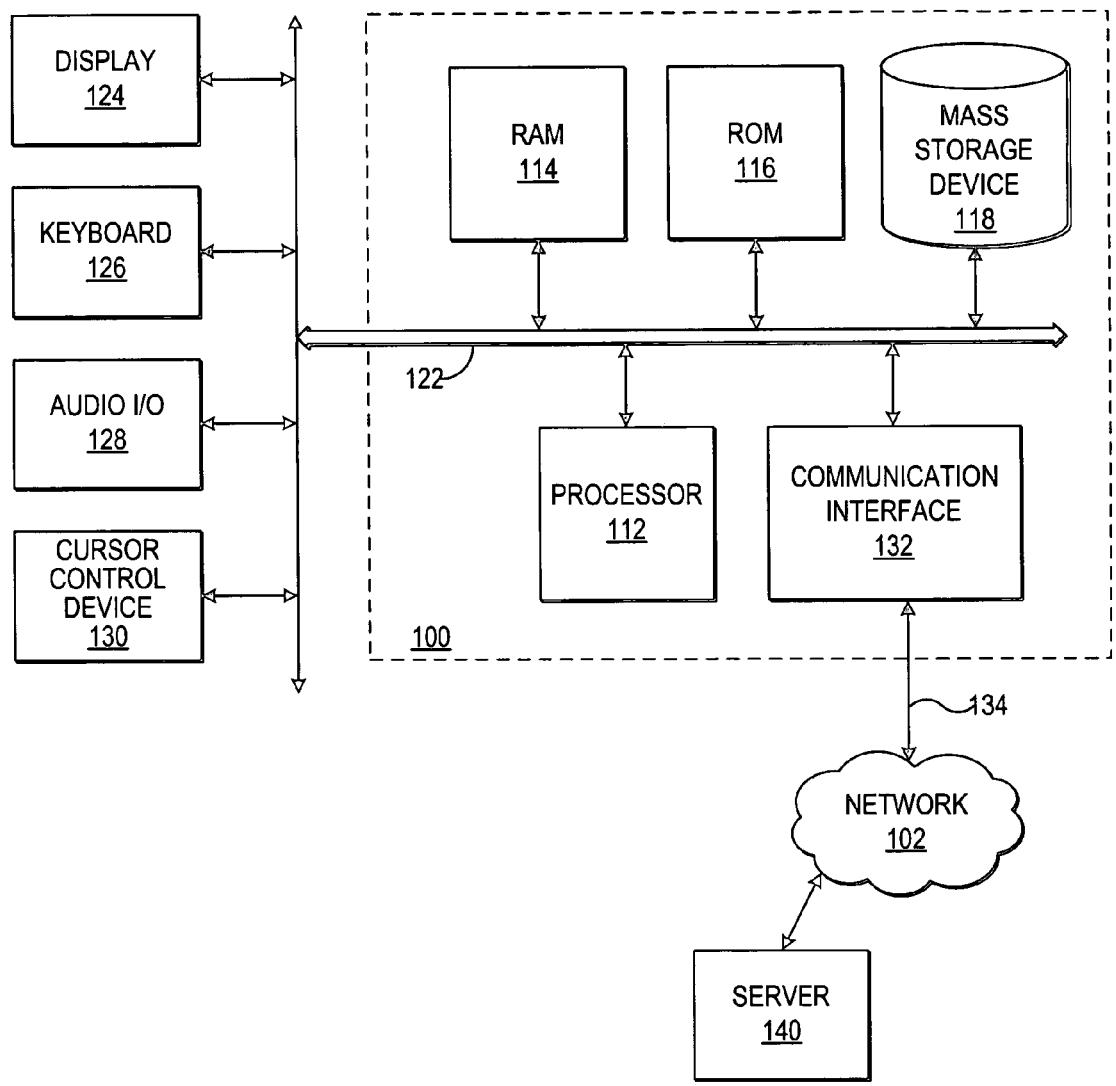
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 9, 10, 11, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or Internet Service Provider (ISP). In particular, network link 134 may provide wired and/or wireless network communications to one or more networks.

Network link 134 is connected to network 102. Network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals through network link 134 and communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio input/output (I/O) device 128 is connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
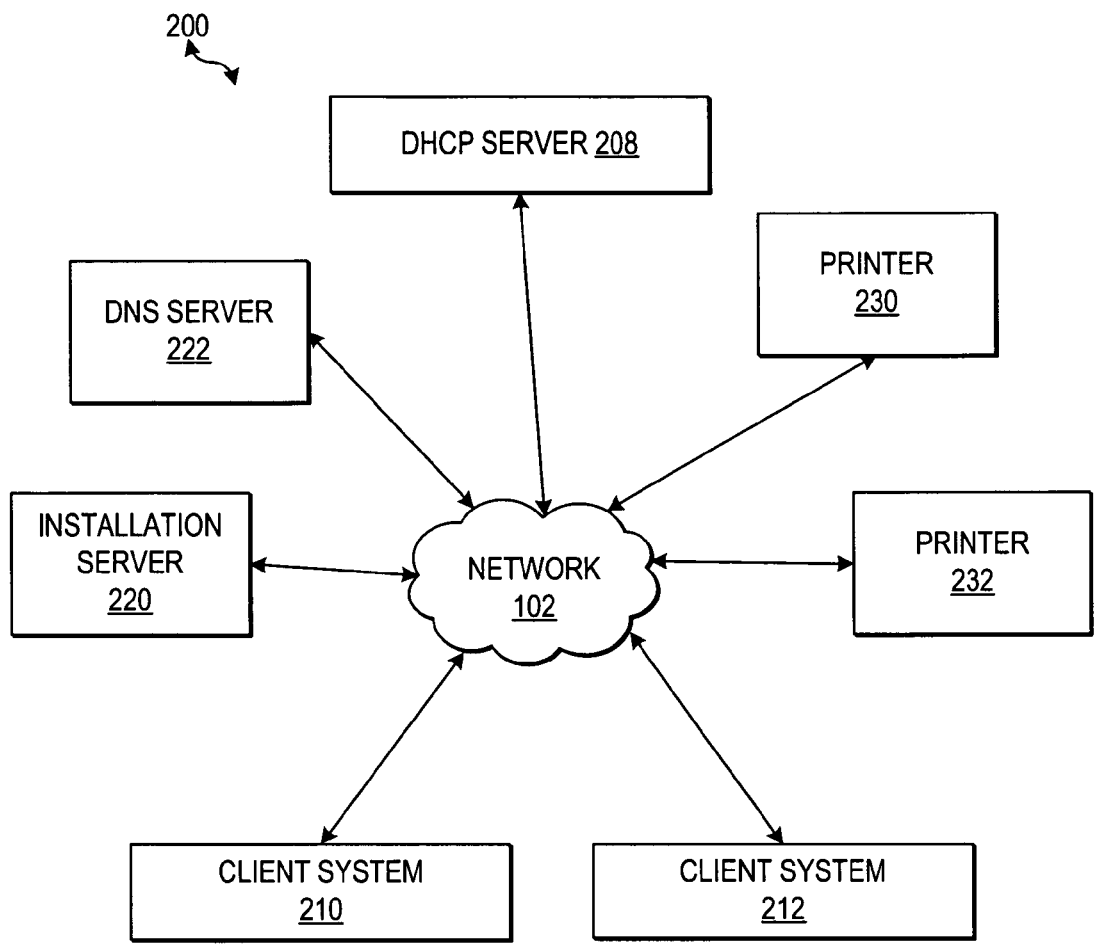
FIG. 2 is a block diagram depicting a distributed network system with dynamically configured systems managed by a DHCP server.

With reference now to FIG. 2, a block diagram depicts a distributed network system with dynamically configured systems managed by a DHCP server. Distributed network system 200 is a network of client systems and server systems in which one embodiment of the invention may be implemented. It will be understood that the present invention may be implemented in other embodiments of systems enabled to communicate via a connection.

In the embodiment, distributed network system 200 contains network 102, which is the medium used to provide communications links between various devices and computers connected together within network system 200. Network 102 may include permanent connections such as wire or fiber optics cables, temporary connections made through telephone connections and wireless transmission connections.

A DHCP server 208 preferably provides configuration parameters to the other systems in distributed network system 200 and in particular, manages the allocation of dynamic IP addresses to any of the server and client systems depicted in distributed network system 200. Alternatively, a static IP address may be assigned to a system within distributed network system 200.

According to an advantage of the present invention, DHCP server 208 is enabled to allow a system accessing DHCP server 208 to modify the DHCP configuration for another system within distributed network 200 within the requesting system logging in to DHCP server 208. As will be described in detail below, first, the system requesting to modify the DHCP configuration may be granted modify privileges from DHCP server 208. Next, once a system is granted modify privileges, the system can send a MODIFY packet to DHCP server 208 requesting the modification. DHCP server 208 receives the MODIFY packet, verifies the modify privileges of the requesting system, and itself controls the modification of the configuration file according to the MODIFY packet.

It is important to note that the present invention is particularly advantageous where the system sending the MODIFY packet is independent from DHCP server 208. It will be understood, however, that DHCP server 208 may perform multiple functions, including the functions of the other systems depicted in distributed network system 200.

Further, it is important to note that a particular system may be granted modify privileges or the user currently logged into the system may be granted the modify privileges from that system. It will be understood that multiple methods may be implemented for granting privileges and authenticating a system to verify privileges.

As depicted, distributed network system 200 includes client system 210 and 212, which are systems typically requesting services within distributed network system 200. DHCP server 208 may assign dynamic IP addresses and other network configuration settings to client systems 210 and 212. It will be understood, however, that client system 210 and 212 may also function as server systems and provide services to other systems in distributed network system 200.

According to an advantage of the present invention, either of client systems 210 and 212 may be granted modify privileges from DHCP server 208 and thereafter MODIFY packets sent by either of client systems 210 or 212 which will be implemented by DHCP server 208 to modify the configuration of another system. Further, according to an advantage of the present invention, other systems may request to modify the DHCP configuration of client systems 210 and 212.

In addition, in the example depicted, distributed network system 200 includes an installation server 220 that controls the installation of software on client systems 210 and 212 and other systems within distributed network system 200. It will be understood that multiple installation servers may be included within distributed network system 200, wherein each installation server provides installs for a particular operating system.

According to an advantage of the present invention, installation server 220 may be granted modify privileges and send a MODIFY packet to DHCP server 208 requesting an extension of the lease time of a system receiving a network install controlled by installation server 220. In particular, when performing a software installation on a dynamically configured system, such as client system 210, it is advantageous for the system to maintain the same address during the duration of the installation and the re-registration with DHCP server 208 after the installation.

Further, in the example, a Domain Name System (DNS) server 222 is depicted which maintains a database of host computers and their associated IP addresses. Further, the DNS database may include Media Access Control (MAC) addresses that identify each node within distributed network system 200.

According to an advantage of the present invention, DNS server 222 may receive modify privileges from DHCP server 208 and then send a MODIFY packet to update the hostname assigned to a specific MAC address in the DHCP configuration file. It will be understood that DNS server 222 may send MODIFY packets requesting other types of configuration modifications.

Moreover, in the example depicted, distributed network system 200 includes printers 230 and 232 are network printers that client systems 210 and 212, for example, may be configured to send print requests. According to an advantage of the present invention, a system which manages printers 230 and 232 may receive modify privileges and send a MODIFY packet to DHCP server 208 requesting a modification of the list of printers specified for a particular subnet or class of DHCP client systems.

Further, it will be understood that MODIFY packets may be sent to DHCP server 208 to modify other types of configuration specifications. For example, a system managing the network services within distributed network system 200 may sent a MODIFY packet to update the DHCP options of DHCP server 208.

Figure 3:
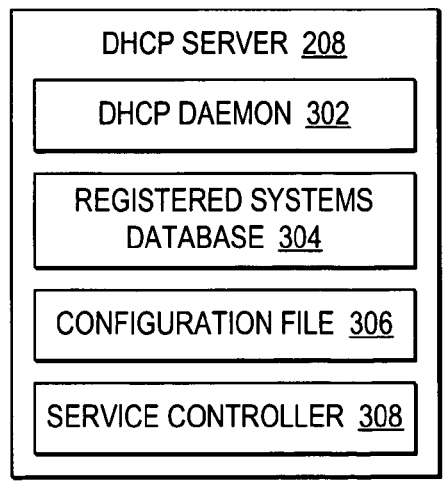
FIG. 3 is a block diagram depicting one embodiment of a DHCP server in accordance with the method, system, and program of the present invention

Referring now to FIG. 3, there is depicted a block diagram of one embodiment of a DHCP server in accordance with the method, system, and program of the present invention. As illustrated, a DHCP server 208 includes a DHCP daemon 302 and a service controller 308. Further, DHCP server includes a registered systems database 304 and a configuration file 306. It will be understood that alternate configurations of a DHCP server with alternate components and data storage structures may also implement the present invention.

DHCP daemon 302 controls packet receipt and transmission for DHCP server 208. In particular, as an advantage of the present invention, a client system may register with DHCP server 208 for modification privileges. Registered systems database 304 maintains a record of each client system granted modification privileges. Thus, when a client system sends a MODIFY packet that is received at DHCP server 208, DHCP daemon 302 receives the MODIFY packet and authenticates the requesting system identity, accessing registered systems database 304 to determine what privileges are provided to the requesting system.

Further registered systems database 304 may maintain a record of user identifiers and system identifiers and the modification privileges that each is allowed. For example, a network administrator identifier may be specified to modify all options provided by a DHCP server, such that when the network administrator logs on to any system within the network, the system is temporarily registered for all modify privileges. In another example, specified modification options may be set for any installation server registering with DHCP server 208, such as the privilege to modify the lease time option.

DHCP server 208 may implement multiple types of authentication for registered systems. For example, when a system registers, DHCP daemon 302 may send a trusted key to the registered system. The trusted key is then used to authenticate the registered system. In another example, when a system registers, the IP address or MAC address of the system is recorded and used to authenticate the sending system of a MODIFY request.

Service controller 308 preferably controls the actual service options provided by DHCP server 208 according to the settings of configuration file 306. Configuration file 306 may include multiple configuration settings for each of the systems available via network 102. In particular, the systems available via network 102 may each be specified as a client, a class or a network.

Further, responsive to DHCP daemon 302 authenticating a system sending a MODIFY packet, service controller 308 modifies configuration file 306 according to the modifications requests in the MODIFY packet. Importantly, once the modifications to configuration file 306 are made, DHCP server 208 does not need to be restarted since service controller 308 performs the modification to configuration file 306 based on a packet, rather than a remote system logging into DHCP server 208 and performing the modification.

Table 1 illustrates an example a general configuration of a MODIFY packet that might be received by DHCP server 208. In particular, a code number, such as "9", may be designated for the MODIFY message type.

TABLE 1

IP Header
TCP Header
DHCP Message
Message type = DHCPMODIFY code
... Other standard parameters for a DHCP message ...
Client/class/network = DHCP client, class, or network to modify
Option = Option to be Modified
Option Value = Values of Option to be Modified Table 2 illustrates an example of the DHCP message portion of a MODIFY packet requesting modification of the lease-time of a client identified as "client 1".

TABLE 2

Message type = 9 [DHCPMODIFY code]
... Other standard parameters for a DHCP message ...
Client = client1
Option = 51 [lease-time]
Option value = 10800

Figure 4:
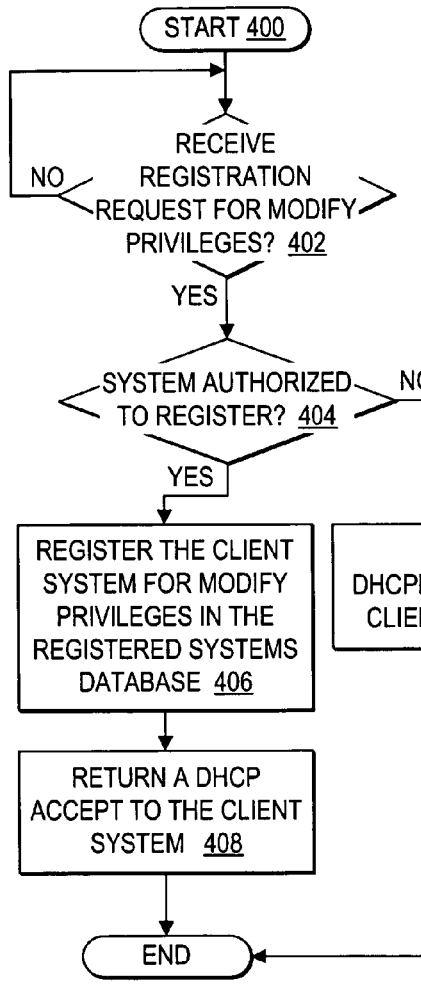
FIG. 4 is a high level logic flowchart of a process and program for controlling registration of a client system with a DHCP server for modify privileges.

With reference now to FIG. 4, there is depicted a high level logic flowchart of a process and program for controlling registration of a client system with a DHCP server for modify privileges. As depicted, the process starts at block 400 and thereafter proceeds to block 402. Block 402 depicts a determination whether the DHCP server receives a registration request for modify privileges. If the request is not received, then the process iterates at block 402. If the request is received, then the process passes to block 404. Block 404 depicts a determination whether the client system is authorized to register. In particular, multiple requirements may be specified for filtering which client systems are authorized to register for modify privileges. For example, specific client system identifiers may be specified as being allowed to register. In another example, the user logged on to the client system may be allowed to temporarily register the system. Further, registration may be restricted to client systems with certain security privileges for accessing other parts of the network.

At block 404, if the system is not authorized to register, then the process passes to block 410. Block 410 depicts returning a DHCPDECLINE packet to the client system, and the process ends.

Alternatively, at block 404, if the system is authorized to register, then the process passes to block 406. Block 406 depicts registering the client system for modify privileges in the registered systems database. Next, block 408 depicts returning a DHCPACCEPT packet to the client system, and the process ends.

Figure 5:
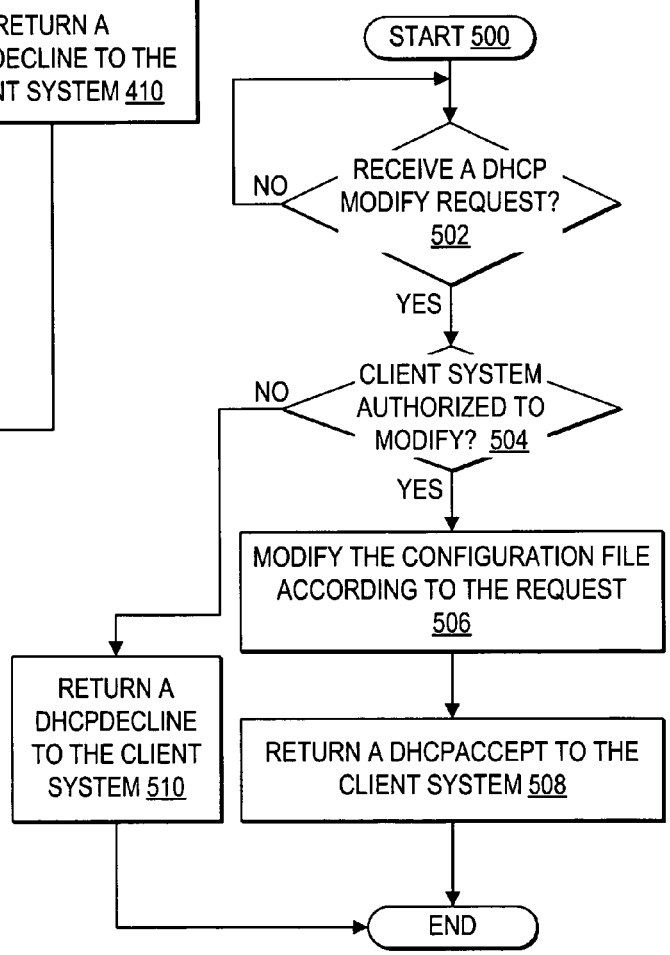
FIG. 5 is a high level logic flowchart depicting a process and program for controlling the modification of a DHCP server by a registered client modification request

Referring now to FIG. 5, there is depicted a high level logic flowchart of a process and program for controlling the modification of a DHCP server by a registered client modification request. As illustrated, the process starts at block 500 and thereafter proceeds to block 502. Block 502 depicts a determination whether a DHCPMODIFY request is received. If a DHCPMODIFY request is not received, then the process iterates at block 502. If a DHCPMODIFY request is received, then the process passes to block 504. Block 504 depicts a determination whether the client system is authorized to request a DHCPMODIFY. In particular, the client system must be authenticated for authorization to modify the DHCP configuration of another system.

At block 504, if the client system is not authorized to request a DHCPMODIFY, then the process passes to block 510. Block 510 depicts returning a DHCPDECLINE packet to the client system, and the process ends.

Alternatively, at block 504, if the client system is authorized to request a DHCPMODIFY, then the process passes to block 506. Block 506 depicts modifying the configuration file according to the request. Next, block 508 depicts returning a DHCPACCEPT to the client system, and the process ends.

Figure 6:
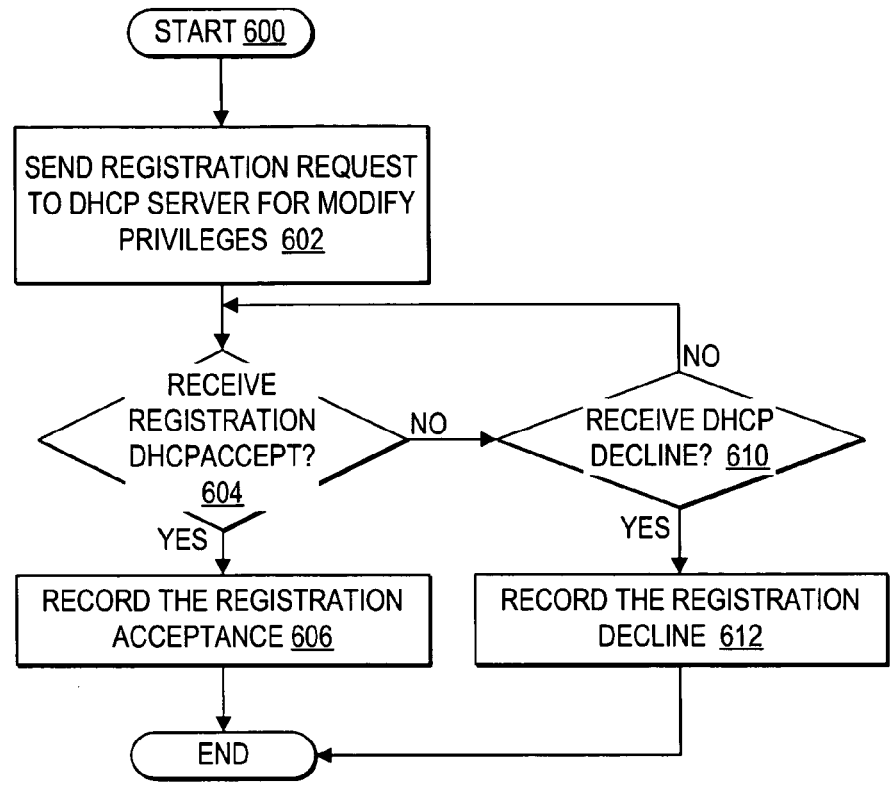
FIG. 6 is a high level logic flowchart depicting a process and program for registering a client system with modify privileges with a DHCP server.

With reference now to FIG. 6, there is depicted a high level logic flowchart of a process and program for registering a client system with modify privileges with a DHCP server. As depicted, the process starts at block 600 and thereafter proceeds to block 602. Block 602 depicts sending a registration request to the DHCP server for modify privileges. Next, block 604 depicts a determination whether the registration is accepted with a DHCPACCEPT or other acceptance packet. If a registration acceptance packet is received, then the process passes to block 606. Block 606 depicts recording the registration acceptance, including any security keys, and the process ends. Alternatively, if a registration acceptance packet is not received, then the process passes to block 610. Block 610 depicts a determination whether a DHCPDECLINE is received. If a DHCP decline is not received, then the process returns to block 604. If a DHCPDECLINE is received, then the process passes to block 612. Block 612 depicts recording the registration decline, and the process ends.

Figure 7:
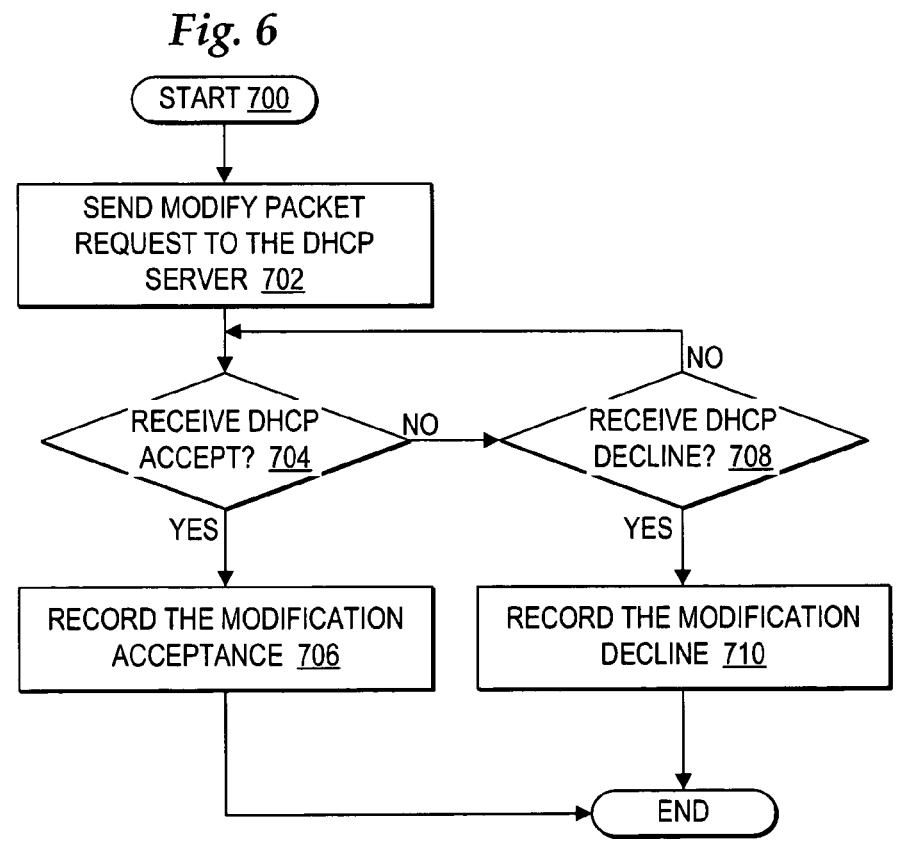
FIG. 7 is a high level logic flowchart depicting a process and program for controlling a DHCP modification request from a client system.

Referring now to FIG. 7, there is depicted a high level logic flowchart of a process and program for controlling a DHCP modification request from a client system. As depicted, the process starts at block 700 and thereafter proceeds to block 702. Block 702 depicts sending a modify packet request to the DHCP server. In addition, any security key or other information required to authenticate the client system is sent. Next, block 704 depicts a determination whether a DHCPACCEPT packet is received. If a DHCPACCEPT packet is received, then the process passes to block 706. Block 706 depicts recording the modification acceptance, and the process ends. Alternatively, at block 704, if a DHCPACCEPT packet is not received, then the process passes to block 708. Block 708 depicts a determination whether a DHCPDECLINE packet is received. If a DHCPDECLINE packet is not received, then the process returns to block 704. If a DHCPDECLINE packet is received, then the process passes to block 710. Block 710 depicts recording the modification decline, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for modifying a Dynamic Host Configuration Protocol (DHCP) server configuration for a dynamically configured system within a network, comprising:

receiving a request from a first system to register for a lease time modification privilege at a daemon of said DHCP server, wherein said first system is an installation server for installing software on at least one dynamically configured system independent from said DHCP server, wherein said daemon of said DHCP server allows a plurality of systems to each register for at least one of a plurality of types of modification privileges at said DHCP server;

responsive to said first system qualifying for modification privileges, storing by said daemon a record of said registration at said DHCP server for authenticating any modify packets received from said first system;

receiving a first modify packet from said first system by said daemon of said DHCP server which manages a stored configuration file specifying a dynamic internet protocol (IP) address for said dynamically configured system, wherein said first modify packet requests an extension of a lease time of said dynamic IP address for said dynamically configured system for a duration of an installation on said dynamically configured system by said first system; and responsive to said daemon confirming said first system as registered with said DHCP server, modifying by a service controller of said DHCP server said stored configuration file for said dynamically configured system according to said first modify packet received from said first system, such that said first system is enabled to request modification of said configuration file for said dynamically configured system to maintain a same address for said dynamically configured system during said installation and said DHCP server controls the modification of said configuration file.

2. The method according to claim 1 for modifying a DHCP configuration, wherein receiving a first modify packet from a first system further comprises:

receiving said first modify packet from said first system, wherein said modify packet specifies one from among a DHCP client, class and network, a particular option from among a plurality of DHCP options, and a value to assigned to said particular option.

3. The method according to claim 1 for modifying a DHCP configuration, further comprising:

receiving a second request from a second system to register for a second lease time modification privilege at said daemon of said DHCP server, wherein said second system maintains a database of a plurality of host computers and a separate IP address associated with each host computer and maintains a plurality of media access control (MAC) addresses for identifying each node in a network least one dynamically configured system independent from said DHCP server;

responsive to said second system qualifying for modification privileges, storing by said daemon a second record of said registration at said DHCP server for authenticating any modify packets received from said second system;

receiving a second modify packet from said second system by said daemon of said DHCP server which manages a stored configuration file comprising a plurality of hostnames each matched to a separate MAC address, wherein said second modify packet requests updating a particular host name assigned to a particular MAC address in said stored configuration file;

responsive to said daemon confirming said second system as registered with said DHCP server, modifying by said service controller of said DHCP server said stored configuration file for said particular MAC address according to said second modify packet received from said second system.

* * * * *